(12) United States Patent
Mizota

(10) Patent No.: US 7,487,814 B2
(45) Date of Patent: Feb. 10, 2009

(54) DEVICE OF FORMING TIRE REINFORCING LAYER

(75) Inventor: Yasuo Mizota, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 272 days.

(21) Appl. No.: 10/543,192

(22) PCT Filed: Jan. 22, 2004

(86) PCT No.: PCT/JP2004/000550

§ 371 (c)(1),
(2), (4) Date: Jul. 22, 2005

(87) PCT Pub. No.: WO2004/065110

PCT Pub. Date: Aug. 5, 2004

(65) Prior Publication Data

US 2006/0130958 A1    Jun. 22, 2006

(30) Foreign Application Priority Data

Jan. 22, 2003  (JP) .............................. 2003-013282

(51) Int. Cl.
*B29D 30/30* (2006.01)
*B29D 30/70* (2006.01)
(52) U.S. Cl. ..................... 156/397; 156/117; 156/406; 156/406.4
(58) Field of Classification Search ................ 156/117, 156/397, 405.1, 406, 406.4, 906, 907
See application file for complete search history.

(56) References Cited

U.S. PATENT DOCUMENTS 4,877,468 A    10/1989    Siegenthaler et al.
(Continued)

FOREIGN PATENT DOCUMENTS

EP    0 904 959 A2    9/1998
(Continued)

OTHER PUBLICATIONS

Derwent abstract and Machine translation for JP 2001-105509, Apr. 17, 2001.*

*Primary Examiner*—Geoffrey L Knable
(74) *Attorney, Agent, or Firm*—Sughrue Mion, PLLC

(57) ABSTRACT

An object is to provide a tire reinforcing layer forming device which can form, by a single device, plural reinforcing layers whose cord directions intersect one another. A reinforcing material piece 12A, which is distributed to an upper conveying path 72U, is affixed from a left end side of a drum 16 toward a right side, while the drum 16 is rotated in a direction of arrow CW. In this way, the reinforcing material piece 12A, which is affixed to an outer peripheral surface of the drum 16, falls to the right, i.e., rises to the left. Thereafter, similarly, the reinforcing material pieces 12A are successively affixed without gaps, and a first reinforcing layer is formed. Next, the reinforcing material piece 12A, which is distributed to a lower conveying path 72D, is affixed from the left end side of the drum 16 toward the right side, while the drum 16 is rotated in an opposite direction. In this way, the reinforcing material piece 12A, which is affixed to an outer peripheral surface of the first reinforcing layer, rises to the right. Thereafter, similarly, the reinforcing material pieces 12A are successively affixed without gaps, and a second reinforcing layer is formed.

2 Claims, 4 Drawing Sheets

U.S. PATENT DOCUMENTS

| | | |
|---|---|---|
| 2002/0046796 A1 * | 4/2002 | Hitotsuyanagi et al. ..... 156/117 |
| 2002/0062908 A1 | 5/2002 | Mancini et al. |
| 2003/0051794 A1 * | 3/2003 | Suda et al. ................. 156/906 |

FOREIGN PATENT DOCUMENTS

| | | |
|---|---|---|
| EP | 1 048 445 A2 | 11/2000 |
| JP | 10-128869 A | 5/1998 |
| JP | 11-291362 A | 10/1999 |
| JP | 2001-105509 A | 4/2001 |
| JP | 2001-232695 A | 8/2001 |
| JP | 2002-144446 A | 5/2002 |
| JP | 2003-062916 A | 3/2003 |
| JP | 2003-251711 A | 9/2003 |
| WO | 02/055289 A1 | 7/2002 |

* cited by examiner

DEVICE OF FORMING TIRE REINFORCING LAYER

TECHNICAL FIELD

The present invention relates to a tire reinforcing layer forming device which is for forming tire reinforcing layers on an outer peripheral surface of a drum.

BACKGROUND TECHNOLOGY

As a tire reinforcing layer forming device which forms reinforcing layers of a pneumatic tire, there is, for example, the tire reinforcing layer forming device described in Japanese Patent Application Laid-Open (JP-A) No. 2000-301628.

In this tire reinforcing layer forming device, accompanying the rotational motion of a core, a cut reinforcing material (belt) is fed from one end side onto the peripheral surface of the core, and the reinforcing material is gradually pressed onto the core peripheral surface along the entire length, so as to be press-joined thereto.

However, in this tire reinforcing layer forming device, when forming a so-called intersecting belt which is formed from two belt layers whose cord directions intersect one another, there is the need, with respect to one core, for two devices which are a tire reinforcing layer forming device for forming the belt layer whose cords are inclined upwardly to the right and a tire reinforcing layer forming device for forming the belt layer whose cords are inclined upwardly to the left. Thus, there are the problems that the manufacturing facilities are expensive and require a wide space for placement.

The present invention has been developed in order to overcome the above-described problems, and an object thereof is to provide a tire reinforcing layer forming device which can form, by a single device, plural reinforcing layers whose cord directions intersect one another.

DISCLOSURE OF THE INVENTION

One aspect of the invention is a tire reinforcing layer forming device forming a tire reinforcing layer on an outer peripheral surface of a drum, the tire reinforcing layer forming device including: a drum able to rotate in both forward and reverse directions; conveying means for conveying, toward the drum, a strip-shaped reinforcing material in which a plurality of cords, which are aligned parallel to one another, are rubber coated; cutting means for cutting the reinforcing material obliquely with respect to a transverse direction; a first conveying path provided at a reinforcing material conveying direction downstream side of the cutting means, and guiding the reinforcing material toward one side in a peripheral direction of the drum; a second conveying path provided at the reinforcing material conveying direction downstream side of the cutting means, and guiding the reinforcing material toward another side in the peripheral direction of the drum; distributing means for distributing the reinforcing material, which has been cut, to one of the first conveying path and the second conveying path; and axial direction moving means moving at least the first conveying path and the second conveying path along an axial direction of the drum.

Next, the operation and effects of this tire reinforcing layer forming device will be described.

In this tire reinforcing layer forming device, the cutting means cuts, obliquely with respect to the transverse direction, the reinforcing material which is conveyed by the conveying means. In this way, reinforcing material pieces of a given length can be obtained successively.

The tire reinforcing piece is first distributed to the first conveying path by the distributing means.

The reinforcing material piece which is distributed to the first conveying path is discharged from the first conveying path exit toward the drum.

At this time, the first conveying path exit is made to correspond to an axial direction one end side of the drum, and the leading end of the reinforcing material piece is affixed to the axial direction one end side of the drum, and thereafter, the reinforcing material piece is successively fed out, the drum is rotated in the forward direction, and the first conveying path moves toward the axial direction other side of the drum.

In this way, the reinforcing material piece is affixed to the drum outer peripheral surface with, for example, the cord direction rising to the right.

Thereafter, similarly, the reinforcing material pieces are affixed successively and without gaps in the peripheral direction of the drum outer peripheral surface, and a first reinforcing layer can be formed on the drum outer peripheral surface.

Next, a second reinforcing layer is formed.

This time, the tire reinforcing piece is distributed to the second conveying path by the distributing means.

The reinforcing material piece distributed to the second conveying path is discharged from the second conveying path exit toward the drum.

At this time, the second conveying path exit is made to correspond to the axial direction one end side of the drum, and the leading end of the reinforcing material piece is affixed to the axial direction one end side of the drum, and thereafter, the reinforcing material piece is successively fed out, the drum is rotated in the opposite direction this time, and the second conveying path moves toward the axial direction other side of the drum.

In this way, the reinforcing material piece is affixed to the drum outer peripheral surface with, for example, the cord direction rising to the left.

Thereafter, similarly, the reinforcing material pieces are affixed successively and without gaps in the peripheral direction of the drum outer peripheral surface, and a second reinforcing layer can be formed on the first reinforcing layer.

In this way, intersecting belt layers can be formed on the outer peripheral surface of the drum.

Note that layers from a third layer on also can be formed similarly.

Accordingly, the tire reinforcing layer forming device of the present invention has the effect that it can form, by a single device, plural reinforcing layers whose cord directions intersect one another.

The tire reinforcing layer forming device may have a reinforcing material exit of the first conveying path that is inclined with respect to the axial direction of the drum, and a reinforcing material exit of the second conveying path that inclined in a direction opposite the reinforcing material exit of the first conveying path.

Next, the operation and effects of this tire reinforcing layer forming device will be described.

Because the cut reinforcing material pieces are affixed at an incline with respect to the axial direction of the drum, by inclining the reinforcing material exit of the first conveying path and the reinforcing material exit of the second conveying path with respect to the drum axial direction, the inclinations of the reinforcing material pieces can be set accurately, and further, it suffices to not twist the reinforcing material pieces at the time of affixing them to the drum, and therefore, the resistance at the time of affixing is decreased.

Note that, because the inclinations of the reinforcing material pieces discharged from the first conveying path and the reinforcing material pieces discharged from the second conveying path are opposite, in conformance therewith, the directions of inclination of the reinforcing material exit of the first conveying path and the reinforcing material exit of the second conveying path are made opposite to one another.

The tire reinforcing layer may include: first moving means for moving at least the first conveying path and the second conveying path in a radial direction orthogonal to the axial direction of the drum, and in directions of approaching and moving away from the drum; first moving means for moving at least the first conveying path and the second conveying path in directions of approaching and moving away from the drum which are orthogonal to the axial direction of the drum; and second moving means for moving at least the first conveying path and the second conveying path in a direction orthogonal to both a moving direction by the first moving means and the axial direction of the drum.

Next, the operation and effects of this tire reinforcing layer forming device will be described In this tire reinforcing layer, at least the first conveying path and the second conveying path can be moved by the first moving means in the radial direction orthogonal to the axial direction of the drum, and in directions of approaching and moving away from the drum.

Further, at least the first conveying path and the second conveying path can be moved by the second moving means in a direction orthogonal to both the moving direction by the first moving means and the axial direction of the drum.

In this way, when the diameter of the drum is changed, the positions of the first conveying path and the second conveying path, which feed-out the reinforcing material pieces, can be set in conformance with the diameter of the drum.

In order to facilitate affixing of the reinforcing material pieces to the drum, the first conveying path and the second conveying path can be moved in a direction orthogonal to both the moving direction by the first moving means and the axial direction of the drum, and the positions thereof can be adjusted.

BEST MODE FOR IMPLEMENTING THE INVENTION

Next, a tire reinforcing layer forming device 10 relating to an embodiment of the present invention will be described in accordance with FIG. 1 through FIG. 4.

Figure 1:
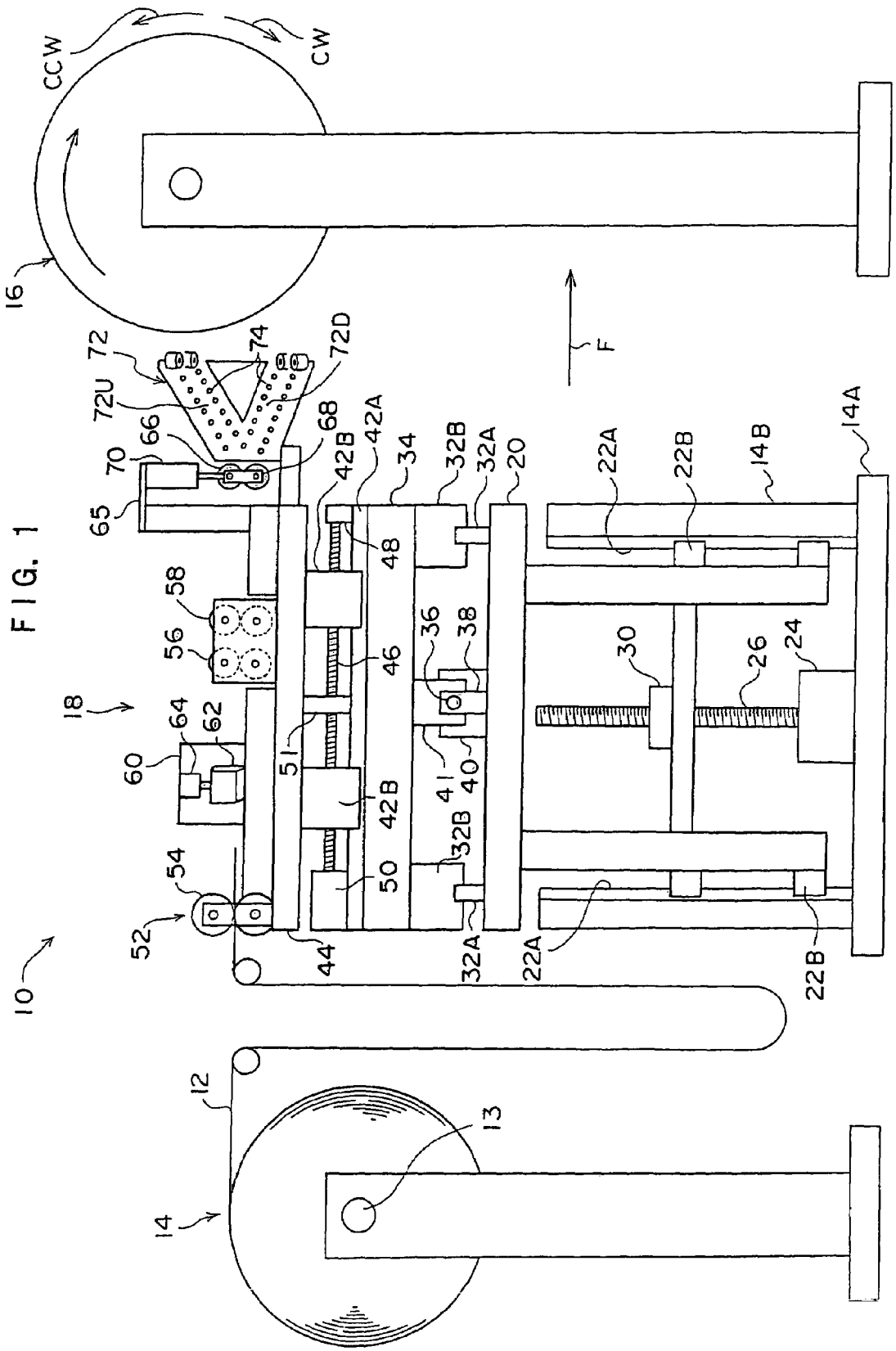
FIG. 1 is a side view of a tire reinforcing layer forming device relating to an embodiment of the present invention.

As shown in FIG. 1, the tire reinforcing layer forming device 10 of the present embodiment has a reinforcing material supplying device 14 which removably supports a shaft 13 around which is wound a strip-shaped reinforcing material 12, a drum 16 to which the reinforcing material 12 is affixed, and an affixing device 18 which affixes the reinforcing material 12 to the drum 16.

The affixing device 18 has a base 14A which is set on a floor surface. A pair of supporting columns 14B, which extend along the vertical direction, stand erect at the top surface of the base 14A.

An up/down sliding member 20 is disposed between the pair of supporting columns 14B.

Slide rails 22A are mounted to the side surfaces of the supporting columns 14B. Slide units (e.g., linear motion bearings or the like) 22B, which are mounted to the side surfaces of the up/down sliding member 20, are held so as to be freely slidable at the slide rails 22A.

Further, a ball screw 26, which rotates by a servo motor 24, is provided parallel to the slide rails 22A at the base 14A.

A nut 30, which screws-together with the ball screw 26, is mounted to the up/down sliding member 20.

Accordingly, due to the ball screw 26 being rotated by the servo motor 24, the up/down sliding member 20 can move up and down.

A pair of slide rails 32A, which extend along the depthwise direction of the surface of FIG. 1 (the axial direction of the drum 16), are provided horizontally at the top surface of the up/down sliding member 20.

A left/right sliding member 34 is provided above the up/down sliding member 20. The left/right sliding member 34 is mounted to slide units 32B which are held so as to be freely slidable at the slide rails 32A of the up/down sliding member 20.

Further, a ball screw 36 is supported so as to be freely rotatable via a bearing 38, at the top surface of the up/down sliding member 20 between the pair of slide rails 32A.

The ball screw 36 rotates by a servo motor 40 which is mounted to the up/down sliding member 20.

A nut 41, which screws-together with the ball screw 36, is mounted to the bottom surface of the left/right sliding member 34.

Accordingly, due to the ball screw 36 being rotated by the servo motor 40, the left/right sliding member 34 can move along the axial direction of the drum 16.

A pair of slide rails 42A (in FIG. 1, only one side is shown), which extend along the left/right direction in FIG. 1 (the direction of arrow F, and the direction opposite to the direction of arrow F), are provided horizontally on the top surface of the left/right sliding member 34.

A front/back sliding member 44 is provided above the left/right sliding member 34. The front/back sliding member 44 is mounted to slide units 42B which are held so as to be freely slidable at the slide rails 42A of the left/right sliding member 34.

Further, a ball screw 46 is supported via a bearing 48 so as to be freely rotatable at the top surface of the left/right sliding member 34 between the pair of slide rails 42A.

The ball screw 46 is rotated by a servo motor 50 which is mounted to the left/right sliding member 34.

A nut 51, which screws-together with the ball screw 46, is mounted to the bottom surface of the front/back sliding member 44.

Accordingly, due to the ball screw 46 being rotated by the servo motor 50, the front/back sliding member 44 can move in a direction of approaching the drum 16 (the direction of arrow F in FIG. 1, and the direction opposite to the direction of arrow F).

A conveying device 52 which conveys the reinforcing material 12 is provided on the top surface of the front/back sliding member 44.

The conveying device 52 has nipping rollers 54, 56, 58 which convey the reinforcing material 12 toward the drum 16. These nipping rollers 54, 56, 58 rotate by an unillustrated servo motor.

A cutting device 60 for cutting the reinforcing material 12 is provided between the nipping rollers 54 and the nipping rollers 56.

The cutting device 60 has a cutter 62 having an angle (θ) with respect to the transverse direction of the reinforcing material 12, and a cylinder 64 for moving the cutter 62 and cutting the reinforcing material 12.

Figure 2:
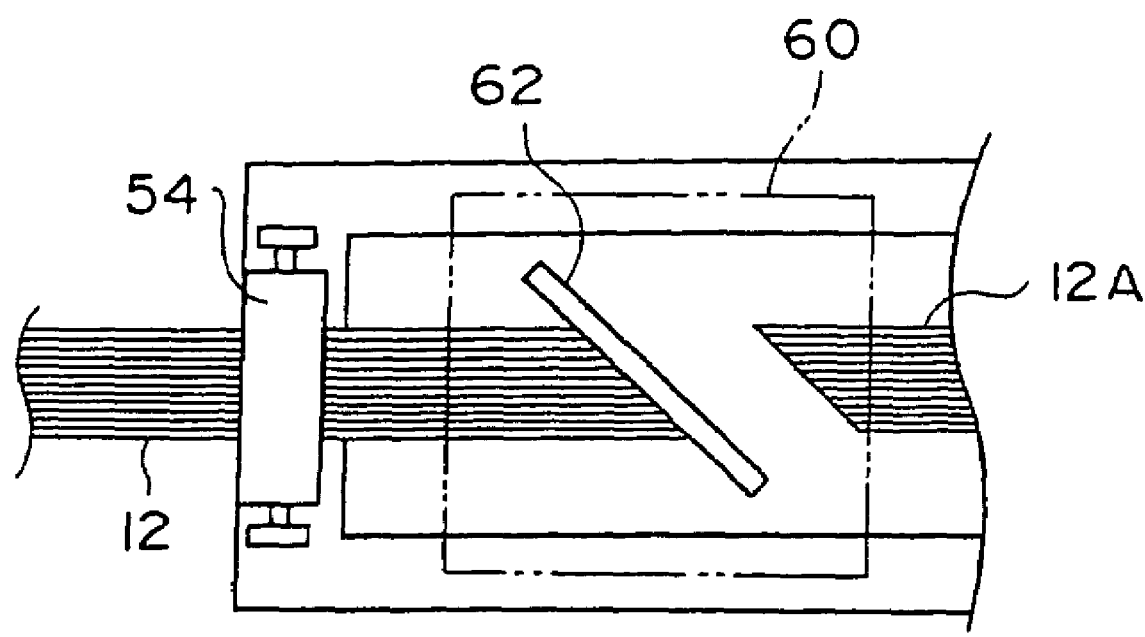
FIG. 2 is a plan view of a cutting device.

As shown in FIG. 2, the cutter 62 of the present embodiment cuts the reinforcing material 12 such that the cut surface rises to the right, as seen from above and from the conveying direction upstream side toward the downstream side.

As shown in FIG. 1, a distributing device 65 is provided at the drum 16 side of the nipping rollers 58.

The distributing device 65 has a pair of upper and lower rollers 66 which are disposed in the horizontal direction. A supporting member 68, which supports the pair of rollers 66 such that they are freely rotatable, can be moved up and down by a cylinder 70.

A conveying guide 72 is provided at the drum 16 side of the distributing device 65.

The conveying guide 72 has an upper conveying path 72U, which guides, at an upward incline, the reinforcing material 12 which is fed out from between the pair of rollers 66 of the distributing device 65, and a lower conveying path 72D which guides, at a downward incline, the reinforcing material 12 which is fed out from between the pair of rollers 66 of the distributing device 65.

Plural bearing rollers 74 are disposed densely along the conveying direction at the upper conveying path 72U and the lower conveying path 72D, respectively.

Figure 3:
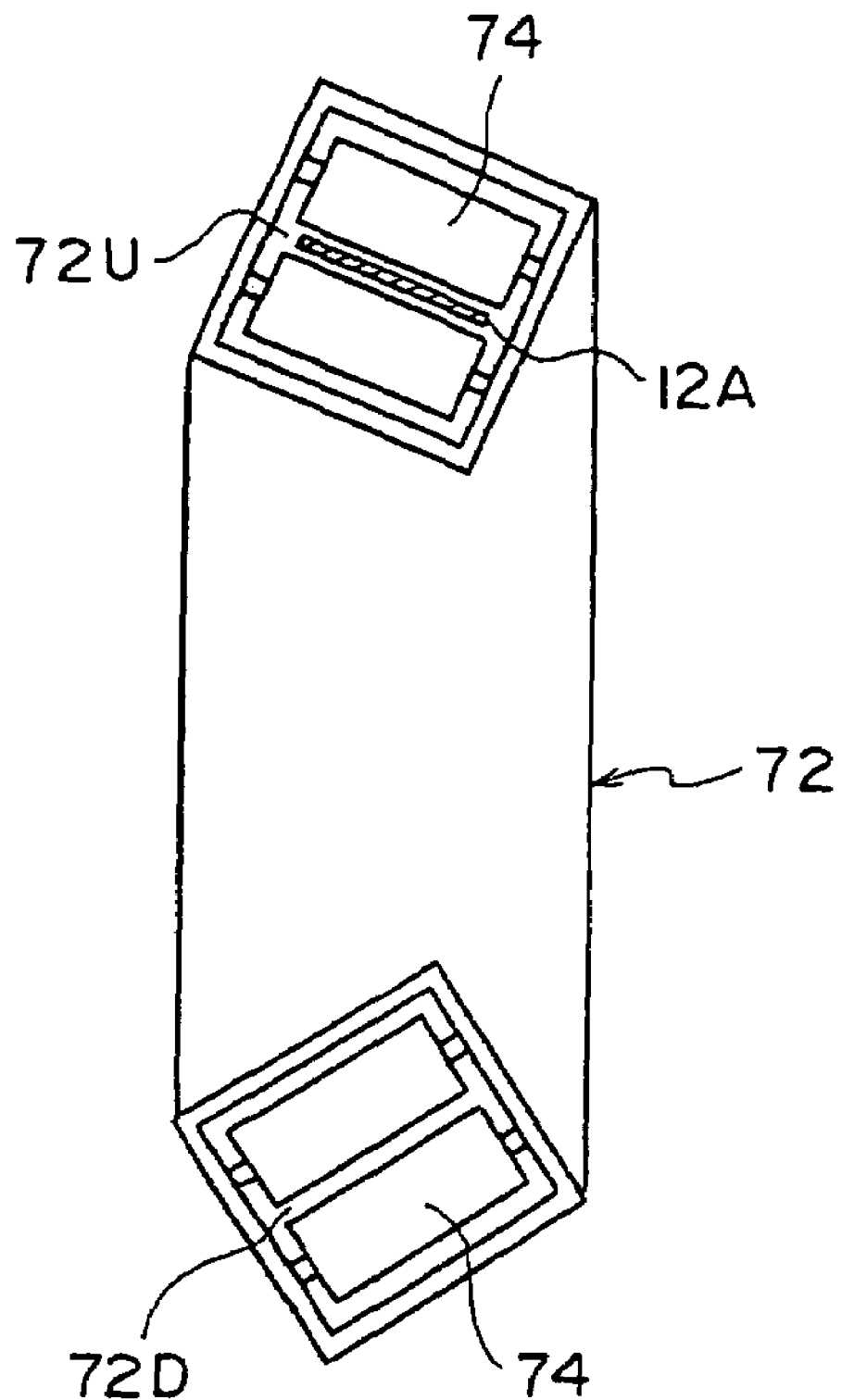
FIG. 3 is a front view of a conveying guide as seen from a drum side.

Here, the upper conveying path 72U and the lower conveying path 72D are gradually twisted as they approach the drum 16. As shown in FIG. 3, when viewing the affixing device from the drum side, the bearing rollers 74 of the exit of the upper conveying path 72U rise to the left, and the bearing rollers 74 of the exit of the lower conveying path 72D rise to the right.

Note that the drum 16 can rotate both forwardly and reversely by an unillustrated servo motor.

(Operation)

Next, operation of the tire reinforcing layer forming device 10 of the present embodiment will be described.

First, the step of forming a first reinforcing layer on the drum 16 will be described.

The reinforcing material 12 is pulled-out by a predetermined amount by the conveying device 52, and cutting is carried out by the cutting device 60, and reinforcing material pieces 12A of uniform lengths are successively obtained. Note that the reinforcing material piece 12A is a parallelogram.

The cut reinforcing material piece 12A is conveyed by the conveying device 52 toward the distributing device 65.

The reinforcing material piece 12A is first, via between the rollers of the distributing device 65, distributed to the upper conveying path 72U.

The reinforcing material piece 12A, which is distributed to the upper conveying path 72U, is discharged from the upper conveying path exit toward the drum.

Figure 4A:
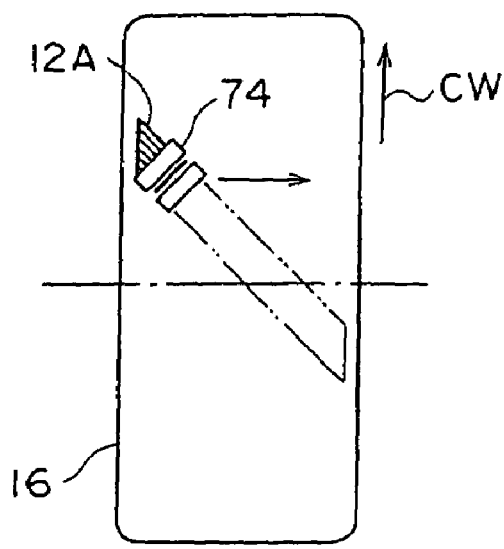
FIG. 4(A) is an explanatory diagram showing a process for forming a first reinforcing layer.
Figure 4B:
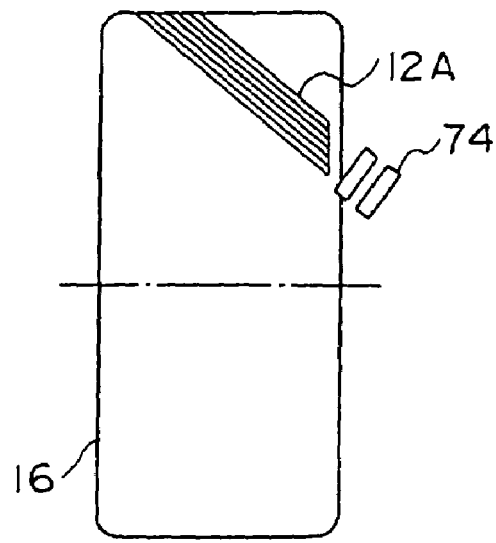
FIG. 4(B) is an explanatory diagram showing a process for forming the first reinforcing layer.

At this time, the upper conveying path exit is made to correspond to the left end side of the drum 16, and the leading end of the reinforcing material piece 12A is affixed to the left end side of the drum 16 (see FIG. 4(A)). Thereafter, the reinforcing material piece 12A is successively fed-out, the drum 16 is rotated in the direction of arrow CW (in FIG. 1, the clockwise direction), and the left/right sliding member 34 moves toward the right end side of the drum 16 (see FIG. 4(B)).

In this way, the reinforcing material piece 12A which is affixed to the outer peripheral surface of the drum 16 falls to the right, i.e., rises to the left.

Thereafter, similarly, by successively and without gaps affixing the reinforcing material pieces 12A in the peripheral direction of the drum outer peripheral surface, a first reinforcing layer, in which the cords rise to the left, is formed on the outer peripheral surface of the drum 16.

Next, a step of forming a second reinforcing layer on the first reinforcing layer will be described.

Here, the cut reinforcing material piece 12A is distributed to the lower conveying path 72D by the distributing device 65. The position of the pair of rollers 66 of the distributing device 65 is moved by the cylinder 70 further downward than at the time of distributing the reinforcing material piece 12A to the upper conveying path 72U.

The reinforcing material piece 12A which is distributed to the lower conveying path 72D is discharged from the lower conveying path exit toward the drum.

Figure 4C:
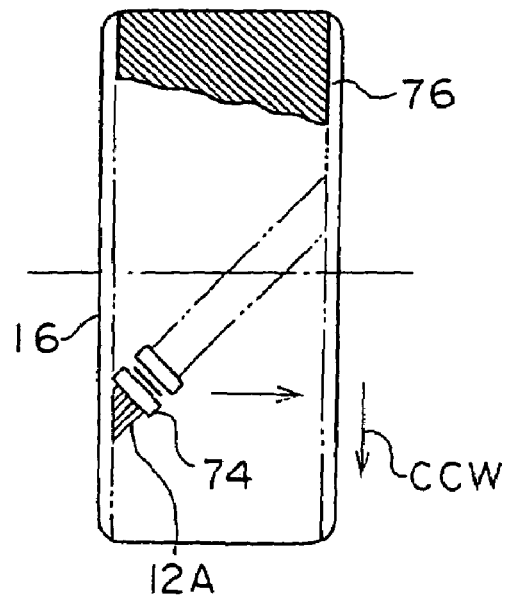
FIG. 4(C) is an explanatory diagram showing a process for forming a second reinforcing layer.
Figure 4D:
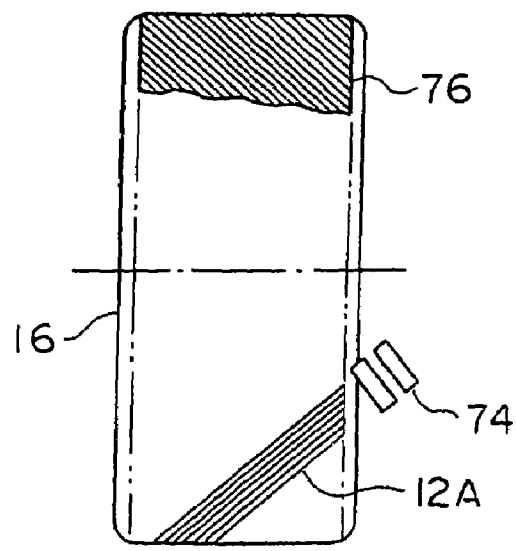
FIG. 4(D) is an explanatory diagram showing a process for forming the second reinforcing layer.

At this time, the second conveying path exit is made to correspond to the left end side of the drum 16, and the leading end of the reinforcing material piece 12A is affixed to the left end side of the drum 16 (see FIG. 4(C)). Thereafter, the reinforcing material piece 12A is successively fed-out, the drum 16 is rotated in the direction of arrow CCW (in FIG. 1, the direction opposite to the clockwise direction), and the left/right sliding member 34 moves toward the right end side of the drum 16 (see FIG. 4(D)).

In this way, the reinforcing material piece 12A which is affixed to the outer peripheral surface of the drum 16 rises to the right.

Thereafter, similarly, by successively and without gaps affixing the reinforcing material pieces 12A in the peripheral direction of the drum outer peripheral surface, a second reinforcing layer, in which the cords rise to the right, is formed on the outer peripheral surface of the first reinforcing layer (reference numeral 76 of FIG. 5).

In this way, in the present embodiment, so-called intersecting belt layers, in which the cord directions intersect one another at the first layer and the second layer, are formed.

Note that, when changing to a drum 16 of a different diameter in accordance with the tire size, the front/back sliding member 44 moves front and back (in the directions of approaching and moving away from the drum 16), and the upper conveying path exit and the lower conveying path exit can be disposed near to the drum 16.

Further, in the present embodiment, a case of forming two layers of belts is described, but thereafter, a third layer and layers thereafter can similarly be formed so as to form three or more intersecting belt layers.

Further, in the present embodiment, the reinforcing material 12 is nipped and conveyed by the nipping rollers 54, 56, 58, but the reinforcing material 12 may be conveyed by a roller conveyor or may be sucked and conveyed.

INDUSTRIAL APPLICABILITY

As described above, the tire reinforcing layer forming device relating to the present invention is suited for use in tire manufacturing factories, and is suited to, for example, cases of forming reinforcing layers of a pneumatic tire.

The invention claimed is:

1. A tire reinforcing layer forming device forming a tire reinforcing layer on an outer peripheral surface of a drum, the tire reinforcing layer forming device comprising:
- a drum able to rotate in both forward and reverse directions;
- conveying means for conveying, toward the drum, a strip-shaped reinforcing material in which a plurality of cords, which are aligned parallel to one another, are rubber coated;
- cutting means for cutting the reinforcing material obliquely with respect to a transverse direction of the reinforcing material;
- a first conveying path provided at a reinforcing material conveying direction downstream side of the cutting means, and guiding the reinforcing material toward the drum;
- a second conveying path provided at the reinforcing material conveying direction downstream side of the cutting means, and guiding the reinforcing material toward the drum;
- distributing means for distributing the reinforcing material, which has been cut, to one of the first conveying path and the second conveying path; and
- axial direction moving means moving at least one of either the first conveying path or the second conveying path along an axial direction of the drum, while discharging the reinforcing material from the one of either the first conveying path or the second conveying path to the rotating drum;
- wherein the distributing means distribute the reinforcing material to the first conveying path and the second conveying path at an initial orientation, the first conveying path is twisted so that a reinforcing material exit of the conveying path is inclined with respect to the initial orientation, and the second conveying path is twisted so that a reinforcing material exit of the first conveying path is inclined with respect to the initial orientation, and the second conveying path is twisted so that a reinforcing material exit of the second conveying path is inclined with respect to the initial orientation in a direction opposite the reinforcing material exit of the first conveying path.

2. The tire reinforcing layer forming device of claim 1, comprising:
- first moving means for moving at least the first conveying path and the second conveying path in directions of approaching and moving away from the drum which are orthogonal to the axial direction of the drum; and
- second moving means for moving at least the first conveying path and the second conveying path in a direction orthogonal to both a moving direction by the first moving means and the axial direction of the drum.

* * * * *